United States Patent
Powell et al.

(10) Patent No.: US 10,387,282 B2
(45) Date of Patent: Aug. 20, 2019

(54) TEST UNIT AND TEST METHOD FOR EFFICIENT TESTING DURING LONG IDLE PERIODS

(71) Applicant: Rohde & Schwarz GmbH & Co. KG, Munich (DE)

(72) Inventors: William Powell, Munich (DE); Moritz Harteneck, Munich (DE); Thomas A Braun, Munich (DE)

(73) Assignee: Rohde & Schwarz GmbH & Co. KG, Munich (DE)

(*) Notice: Subject to any disclaimer, the term of this patent is extended or adjusted under 35 U.S.C. 154(b) by 39 days.

(21) Appl. No.: 15/659,257

(22) Filed: Jul. 25, 2017

(65) Prior Publication Data

US 2018/0081775 A1    Mar. 22, 2018

Related U.S. Application Data

(60) Provisional application No. 62/397,203, filed on Sep. 20, 2016.

(51) Int. Cl.
*G06F 11/22* (2006.01)
*H04B 17/00* (2015.01)
(Continued)

(52) U.S. Cl.
CPC ......... *G06F 11/22* (2013.01); *H04B 17/0085* (2013.01); *H04B 17/309* (2015.01);
(Continued)

(58) Field of Classification Search
CPC ... G06F 11/22; H04B 17/309; H04B 17/0085; H04W 4/70; H04W 24/02; H04W 24/06; H04L 43/50
(Continued)

(56) References Cited

U.S. PATENT DOCUMENTS 5,987,633 A * 11/1999 Newman ............... H04L 43/50
                                                    379/10.03
6,011,830 A *  1/2000 Sasin .................... H04M 3/323
                                                    379/10.03
(Continued)

OTHER PUBLICATIONS

ETSI, "Evolved Universal Terrestrial Radio Access (EUTRA); User Equipment (UE) conformance specification; Radio transmission and reception; Part 1: Conformance testing", Nov. 2014.
(Continued)

*Primary Examiner* — John J Tabone, Jr.
(74) *Attorney, Agent, or Firm* — Potomac Technology Law, LLC (57) ABSTRACT

A test unit for testing a plurality of communications devices is provided. The test unit comprises a test case database, which stores a first test case (including a first test case idle time) and a second test case. The second test case is shorter than the first test case idle time. The test unit comprises a signaling unit. The test unit comprises a test case execution manager, which reads from the test case database the first and second test case and controls the signaling unit to perform measurements according to the first test case on the first device under test until a beginning of the first test case idle time, and controls the signaling unit to perform measurements according to the second test case on the second device under test during the first test case idle time.

17 Claims, 5 Drawing Sheets

(51) Int. Cl.
*H04W 24/02* (2009.01)
*H04L 12/26* (2006.01)
*H04W 4/70* (2018.01)
*H04B 17/309* (2015.01)
*H04W 24/06* (2009.01)

(52) U.S. Cl.
CPC ............... *H04L 43/50* (2013.01); *H04W 4/70* (2018.02); *H04W 24/02* (2013.01); *H04W 24/06* (2013.01)

(58) Field of Classification Search
USPC ......... 714/738, 742, 712; 717/137; 455/423; 379/10.03, 15.01, 27.04
See application file for complete search history.

(56) References Cited

U.S. PATENT DOCUMENTS

| | | | | |
|---|---|---|---|---|
| 7,178,063 | B1* | 2/2007 | Smith ................ | G06F 11/3688 714/38.1 |
| 2002/0162059 | A1* | 10/2002 | McNeely ............... | H04L 43/50 714/703 |
| 2007/0013362 | A1* | 1/2007 | Loh ................... | G01R 31/2886 324/750.01 |
| 2008/0273527 | A1* | 11/2008 | Short ................... | H04J 3/0655 370/364 |
| 2009/0164861 | A1* | 6/2009 | Tseng ................. | G06F 11/263 714/739 |
| 2009/0287960 | A1* | 11/2009 | Arnold ............... | G06F 11/3414 714/33 |
| 2009/0307763 | A1* | 12/2009 | Rawlins ............. | G06F 9/44505 726/5 |
| 2010/0131224 | A1* | 5/2010 | Maeda ............... | G01R 31/3172 702/123 |
| 2010/0204975 | A1* | 8/2010 | Nakayama ..... | G01R 31/318357 703/20 |
| 2010/0250732 | A1* | 9/2010 | Bucknell ............. | H04L 41/5038 709/224 |
| 2011/0181309 | A1* | 7/2011 | Morita ............ | G01R 31/31907 324/750.3 |
| 2013/0174178 | A1* | 7/2013 | Chakraborty ....... | G06F 11/3672 718/105 |
| 2013/0294255 | A1* | 11/2013 | Olgaard ............... | H04W 48/06 370/242 |
| 2014/0019804 | A1* | 1/2014 | Buege .................. | G06F 11/263 714/32 |
| 2015/0058478 | A1* | 2/2015 | Ajiro .................. | G06F 11/3672 709/224 |
| 2015/0189524 | A1* | 7/2015 | Hirst ..................... | H04W 24/08 370/252 |
| 2015/0382208 | A1* | 12/2015 | Elliott ............... | G06F 17/30424 370/252 |
| 2016/0234774 | A1 | 8/2016 | Vejlgaard et al. | |
| 2018/0143897 | A1* | 5/2018 | Shani ................... | G06F 11/302 |

OTHER PUBLICATIONS

Kim, et al., "Improving LTE/LTE-A UE Power Efficiency with Extended DRX Cycle", IEEE 978-1-4799-4449-1, Jan. 2014.
Ratasuk, et al., "Extending LTE Coverage for Machine Type Communications", IEE 978-1-5090-0366, Feb. 2015.
Rico-Alvarino, et al., "An Overview of 3GPP Enhancements on Machine to Machine Communications", IEEE 0163-6804/16, IEEE Communications Magazine, Jun. 2016.

* cited by examiner

TEST UNIT AND TEST METHOD FOR EFFICIENT TESTING DURING LONG IDLE PERIODS

RELATED APPLICATIONS

This application claims the benefit of the earlier filing date under 35 U.S.C. § 119(e) from U.S. Provisional Application Ser. No. 62/397,203 (filed Sep. 20, 2016), the entirety of which is incorporated by reference herein.

FIELD

The present invention relates to testing communications devices, such as 5G communications devices, in automatic testing environments.

BACKGROUND

In communications systems according to new communications standards, such as 5G, long idle times within communications are possible. In order to test the standard-conformity of terminal devices in such systems, it is necessary to test, if these idle times are handled correctly. This though leads to very lengthy tests and thereby to a very high amount of testing equipment time for each device. For example for NB-IoT and eMTC variants, this may be up to 1024×256 ms (around 43.7 minutes). In traditional test setups, a single device under test is attached to a tester. By use of this setup, the testing equipment is idle and merely waits during the idle period to be tested. Especially when testing machine type communications devices MTCD, such long idle times need to be checked. This long idle time is considered a waste of valuable testing resources.

For example the patent publication US 2016/0234774 A1 shows the use of machine type communications devices and the necessity to test long idle times.

This waste of valuable testing equipment time leads to a very inefficient use of the testing equipment.

What is needed, therefore, is a test unit or system and approach for testing communications devices or terminals for communications systems according to new communications standards, such as 5G, where the testing facilitates efficient use of the testing resources (i.e., the test hardware).

SOME EXAMPLE EMBODIMENTS

Embodiments of the present invention advantageously address the foregoing requirements and needs, as well as others, by providing a test unit or system and associated testing methods for testing communications devices or terminals for communications systems according to new communications standards, such as 5G, where the testing facilitates efficient use of the testing resources (i.e., the test hardware).

In accordance with example embodiments of the present invention, a test unit for testing at least a first communications device and a second communications device is provided. The test unit comprises a test case database, which is configured to store at least a first test case, comprising a first test case idle time and a second test case, wherein the second test case is shorter than the first test case idle time. The test unit further comprises a signaling unit, which is connected to at least the first device under test and the second device under test.

According to one embodiment, the test unit comprises a test case execution manager configured to read, from the test case database, at least the first test case and the second test case, to control the signaling unit to perform measurements according to the first test case on the first device under test, until a beginning of the first test case idle time, and to control the signaling unit to perform measurements according to the second test case on the second device under test during the first test case idle time. Thereby, the second test case is nested within the idle time of the first test case. It is thereby possible to significantly increase the efficiency of use of the test unit.

According to a further embodiment, the test unit is configured for testing a third device under test, where the test case database is configured to store a third test case. The second test case in addition to the third test case is shorter than the first test case idle time. The signaling unit is additionally connected to the third device under test, and the test case execution manager is configured to control the signaling unit to perform measurements according to the third test case on the third device under test during the first test case idle time, after performing the measurements according to the second test case on the second device under test. By nesting the second and third test case within the idle time of the first test case, it is possible to further increase the efficiency of time use of the test unit.

According to a further embodiment, the test unit is configured for testing a plurality of further devices under test, where the test case database is configured to store a plurality of further test cases. The plurality of further test cases in sum are shorter than the first test case idle time. The signaling unit is connected to the plurality of further devices under test, and the test case execution manager is configured to control the signaling unit to successively perform measurements according to the plurality of further test cases on the plurality of further devices under test during the first test case idle time. It is thereby possible to further increase the efficiency of use of the test unit.

According to a further embodiment, the test unit comprises a signal splitter configured to selectively connect the signaling unit to at least the first device under test and the second device under test. It is thereby possible to assure that only the signal from the currently measured device under test is processed by the signaling unit, which increases measuring accuracy. By way of example, the test case execution manager is configured to control the signal splitter to connect the first device under test to the signaling unit during performing measurements according to the first test case, and to control the signal splitter to connect the second device under test to the signaling unit during performing measurements according to the second test case. This ensures that only the currently relevant signals are processed, which further increases the measuring accuracy.

According to a further embodiment, the test case execution manager is configured to determine an optimal scheduling of performing the measurements according to said test cases based upon test case durations and the first test case idle time. This further significantly increases the efficiency of time use of the test unit.

According to a further embodiment, the signaling unit is configured to transmit signals to and receive signals from only one of the at least first device under test and second device under test at any one time. This ensures that no stray transmissions influence the measurements, further increasing the measurement accuracy.

According to a further embodiment, at least the first communications device and the second communications device are machine type communications devices and the test units is a machine type communications device test unit.

Especially in case of machine type communications devices, long idle times need to be handled.

According to a further embodiment, each of the at least first test case and second test case comprises an individual active time and idle time. Using the knowledge of the active time and idle time, it is possible to perform an optimal scheduling of the test cases and thereby further increase the efficiency of use of the test unit.

According to a further embodiment, at least the first communications device and the second communications device are 5G communications devices. Especially in case of 5G communications devices, long idle times need to be measured. Therefore, an especially high increase of efficiency of use of the test unit is possible.

According to a further embodiment, the first test case comprises one or more of an NB-IoT test and an eMTC test. In such cases, a significant increase in efficiency of use can be achieved.

According to a further embodiment, the first test case idle time is defined by an eDRX cycle of the first device under test. In such a case, a long idle time can be efficiently filled with further test cases significantly increasing the efficiency of use of the test unit.

In accordance with example embodiments of the present invention, a test method for testing at least a first communications device and a second communications device is provided. The test method comprises storing, in a test case database, at least a first test case comprising a first test case idle time, and a second test case. The second test case is shorter than the first test case idle time.

According to one embodiment, the method further comprises reading, from the test case database, at least the first test case and the second test case, performing measurements according to the first test case on the first device under test, by a signaling unit, until a beginning of the first test case idle time, and performing measurements according to the second test case on the second device under test by the signaling unit during the first test case idle time. Thereby, the second test case is nested within the idle time of the first test case. It is thereby possible to significantly increase the efficiency of use of the test unit.

In accordance with example embodiments of the present invention, a computer program is provided. The computer program comprises program code means for performing all steps according to the test method according to the second aspect of the invention if the program is executed on a computer or a digital signal processor.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

BRIEF DESCRIPTION OF THE DRAWINGS

Embodiments of the present invention are illustrated by way of example, and not by way of limitation, in the figures of the accompanying drawings, in which like reference numerals refer to similar elements, and in which.

DETAILED DESCRIPTION

Approaches for a test unit or system and associated testing methods for testing communications devices or terminals for communications systems according to new communications standards, such as 5G, where the testing facilitates efficient use of the testing resources (i.e., the test hardware). It is apparent, however, that the invention may be practiced without these specific details or with an equivalent arrangement. In other instances, well-known structures and devices are shown in block diagram form in order to avoid unnecessarily obscuring the invention.

As will be appreciated, a module or component (as referred to herein) may be composed of software component(s), which are stored in a memory or other computer-readable storage medium, and executed by one or more processors or CPUs of the respective devices. As will also be appreciated, however, a module may alternatively be composed of hardware component(s) or firmware component(s), or a combination of hardware, firmware and/or software components. Further, with respect to the various example embodiments described herein, while certain of the functions are described as being performed by certain components or modules (or combinations thereof), such descriptions are provided as examples and are thus not intended to be limiting. Accordingly, any such functions may be envisioned as being performed by other components or modules (or combinations thereof), without departing from the spirit and general scope of the present invention. Moreover, the methods, processes and approaches described herein may be processor-implemented using processing circuitry that may comprise one or more microprocessors, application specific integrated circuits (ASICs), field programmable gate arrays (FPGAs), or other devices operable to be configured or programmed to implement the systems and/or methods described herein. For implementation on such devices that are operable to execute software instructions, the flow diagrams and methods described herein may be implemented in processor instructions stored in a computer-readable medium, such as executable software stored in a computer memory store.

Further, terminology referring to computer-readable media or computer media or the like as used herein refers to any medium that participates in providing instructions to the processor of a computer or processor module or component for execution. Such a medium may take many forms, including but not limited to non-transitory non-volatile media and volatile media. Non-volatile media include, for example, optical disk media, magnetic disk media or electrical disk media (e.g., solid state disk or SDD). Volatile media include dynamic memory, such random access memory or RAM. Common forms of computer-readable media include, for example, floppy or flexible disk, hard disk, magnetic tape, any other magnetic medium, CD ROM, CDRW, DVD, any other optical medium, random access memory (RAM), programmable read only memory (PROM), erasable PROM, flash EPROM, any other memory chip or cartridge, or any other medium from which a computer can read data.

Various forms of computer-readable media may be involved in providing instructions to a processor for execution. For example, the instructions for carrying out at least part of the present invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistance (PDA) and a laptop. An infrared detector on the portable computing device receives the information and instructions borne by the infrared signal and places the data on a bus. The bus conveys the data to main memory, from which a processor retrieves and executes the instructions. The instructions received by main memory may optionally be stored on storage device either before or after execution by processor.

First, the underlying problems with respect to current testing approaches is discussed with reference to FIG. 1. The architecture and functioning of test systems or testing units, in accordance with example embodiments of the present invention, are then discussed with reference to FIGS. 2 and 3. Then, the timing of test cases, in accordance with example embodiments of the present invention, and advantages achieved thereby, are discussed with reference to FIG. 4. The operation of a testing method, in accordance with example embodiments of the present invention, is then discussed with reference to FIG. 5. Similar entities and reference numbers in different figures have been partially omitted.

Figure 1:
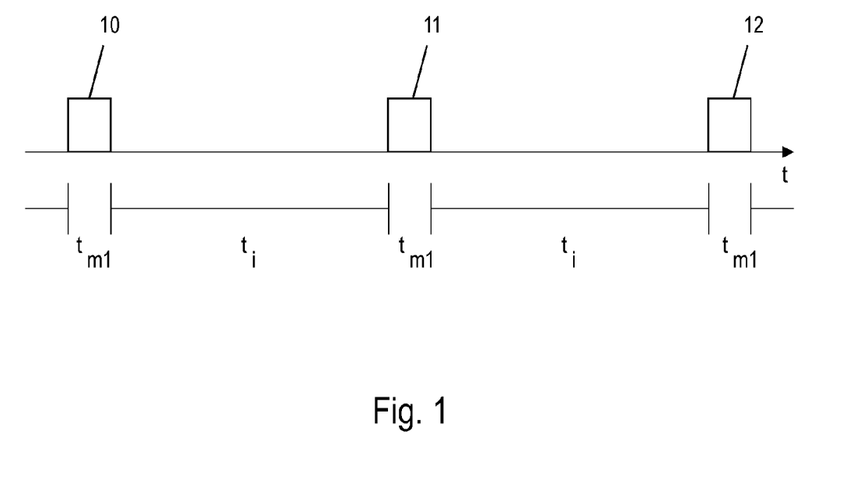
FIG. 1 shows a general timing of test cases for testing communications devices.

FIG. 1 shows a general timing of test cases for testing communications devices. A test unit performs successive measurements 10, 11, 12, which all belong to a single test case. The test case has an active time $t_{m1}$ and an idle time $t_i$. It can readily be seen from FIG. 1 that the idle time $t_i$ significantly outweighs the active time $t_{m1}$. Although here a number of successive measurements 10, 11, 12 is shown, a test case does not need to comprise several active times and idle times. Also a single idle time surrounded by two active times is possible.

Figure 2:
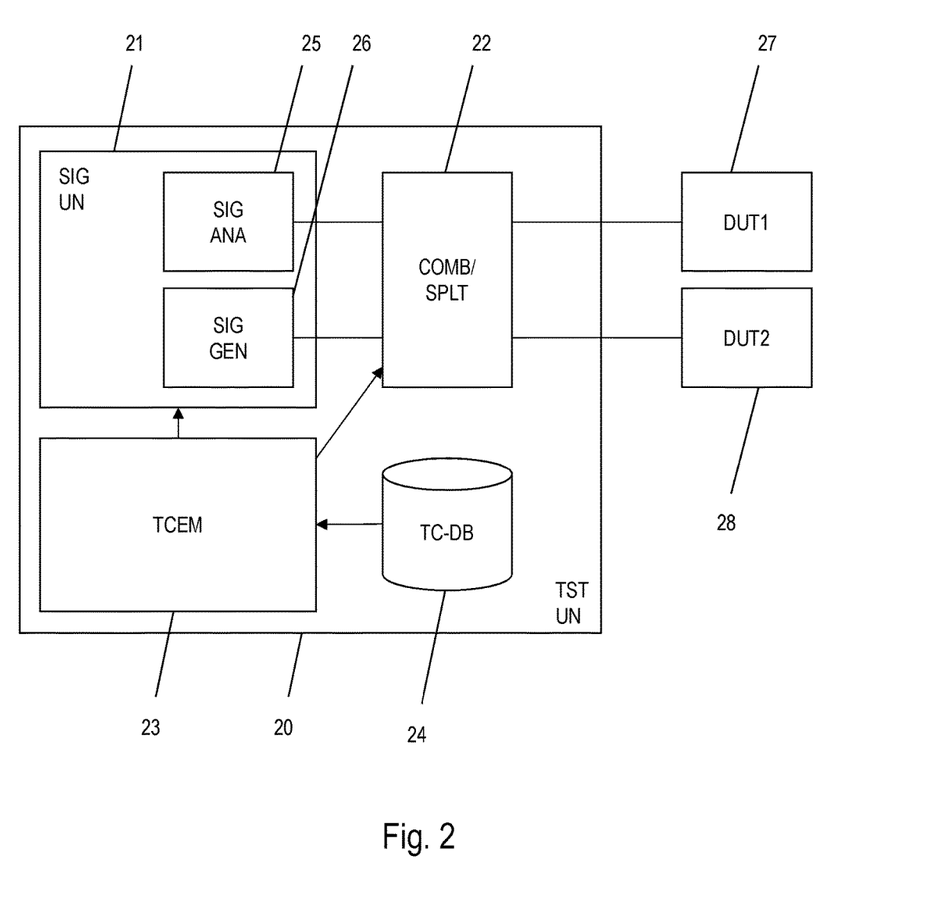
FIG. 2 shows a block diagram of a first example testing unit, in accordance with example embodiments.

FIG. 2 shows a block diagram of a first example testing unit 20, in accordance with example embodiments of the present invention. The testing unit 20 comprises a signaling unit 21, a signal splitter 22, a test case execution manager 23 and a test case database 24. The testing unit 20 is connected to a first device under test 27 and to a second device under test 28. The signal splitter 22 is connected to the devices under test 27, 28. The signal splitter 22 is also connected to the signaling unit 21. The test case execution manager 23 is connected to the signaling unit 21 and to the test case database 24. The test case execution manager is also connected to the signal splitter 22 and is configured to control the signal splitter 22. By way of example, the test case execution manager 23 controls which device under test 27, 28 is connected to the signaling unit 21 at which time, by use of the signal splitter 22. Further, the signaling unit 21 comprises a signal analyzer 25 and a signal generator 26, which are both connected to the signal splitter 22.

Within the test case database 24, a number of test cases are stored. At least a first test case and a second test case are stored within the test case database 24. Each test case comprises timing information including active times and idle times within the respective test case. Moreover, each test case includes measurement types and respective settings for the signaling unit 21.

According to one embodiment, the test case execution manager 23 is configured to read from the test case database 24 all test cases which are to be performed with the devices under test 27, 28 presently connected to the testing unit 20. The test case execution manager 23 then determines an optimal scheduling based upon the timing information of the test cases. The test case execution manager 23 then controls the signaling unit 21 to perform the measurements according to the determined optimal scheduling. Further, the test case execution manager 23 may nest test cases within idle times of other test cases.

By way of example, the test case execution manager 23 reads from the test case database 24 a first test case and a second test case. The first test case is for testing the first device under test 27, while the second test case is for testing the second device under test 28. The test case execution manager 23 determines an optimal scheduling of the first test case and the second test case. Since, in the presently described example, the optimal scheduling starts with the first test case, the test case execution manager 23 controls the signal splitter 22 to connect the first device under test 27 to the signaling unit 21. Then the test case execution manager 23 controls the signaling unit 21 to begin performing the first test case on the first device under test 27. This may encompass, for example, generating a signal by the signal generator 26 and transmitting it to the device under test 27 and receiving a signal from the first device under test 27 and analyzing it with the signal analyzer 25.

Further, the measurements are performed until the beginning of a first idle time of the first test case. The previously determined optimal scheduling now comprises nesting the second test case within the idle time of the first test case. This means that the test case execution manager 23 controls the signal splitter 22 to disconnect the first device under test 27 and instead connect the second device under test 28 to the signaling unit 21. The test case execution manager 23 then controls the signaling unit 21 to perform measurements according to the second test case on the second device under test 28. By way of example, this may also comprise generating signals by the signal generator 26 and transmitting it to the device under test 28 and receiving signals from the second device under test 28 and analyzing them with the signal analyzer 25. After the measurements according to the second test case are completed, the test case execution manager 23 again controls the signal splitter 22 to disconnect the second device under test 28 from the signaling unit 21 and to reconnect the first device under test 27 to the signaling unit 21. The first test case can then be resumed after the passing of the idle time.

According to further embodiments, instead of only testing two devices under test, the testing of three or more devices under test is also possible. Further, a test case can comprise more than one active time and more than one idle time. Each idle time can be used to nest active times of other test cases. Also a switching back and forth between different test cases is possible, if both test cases have idle times.

By way of example, in testing communications devices for a 5G communications system, such as in machine type communications devices, NB-IoT and eMTC measurements are suitable for the proposed approaches. There, long idle times are necessary in order to test the device under test. For example, idle times during the device under test eDRX cycle can be used.

Figure 3:
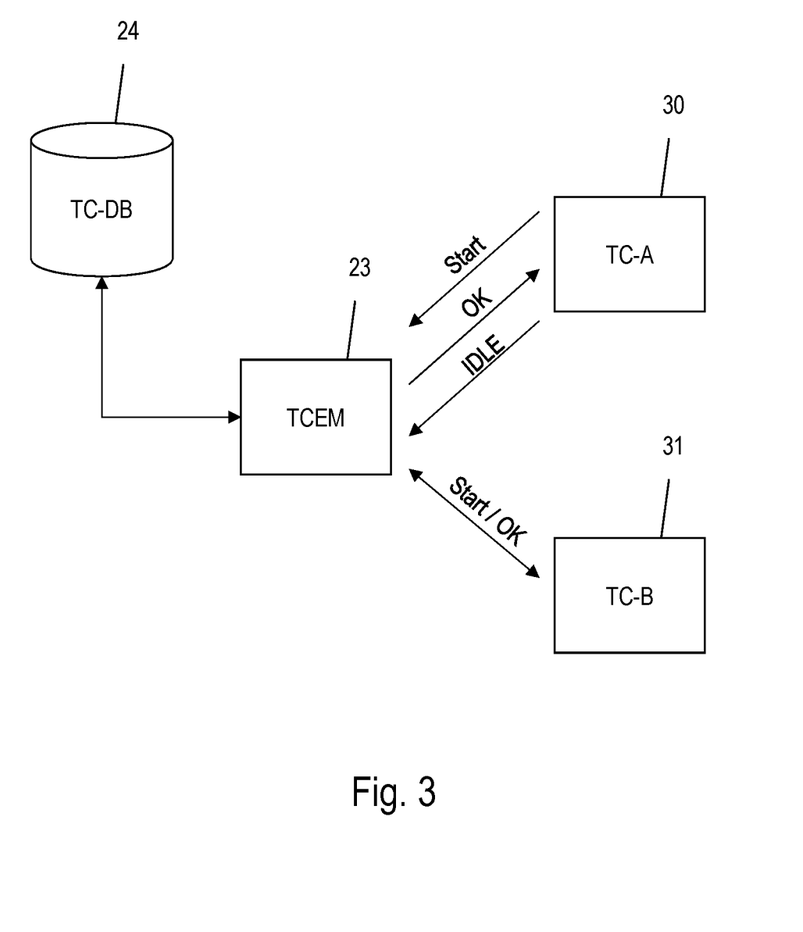
FIG. 3 shows a block diagram of a second example testing unit, in accordance with example embodiments.

FIG. 3 shows a block diagram of a second example testing unit, in accordance with example embodiments of the present invention. In FIG. 3, the switching between different test cases 30, 31 is depicted. According to such example embodiments, the test case execution manager 23 reads from the test case database 24 the test cases 30, 31. The start of the first test case 30 is arranged by a handshake. When the first idle time begins, the test case execution manager 23 starts the second test case 31. When the second test case 31 is finished, the first test case 30 is resumed.

Figure 4:
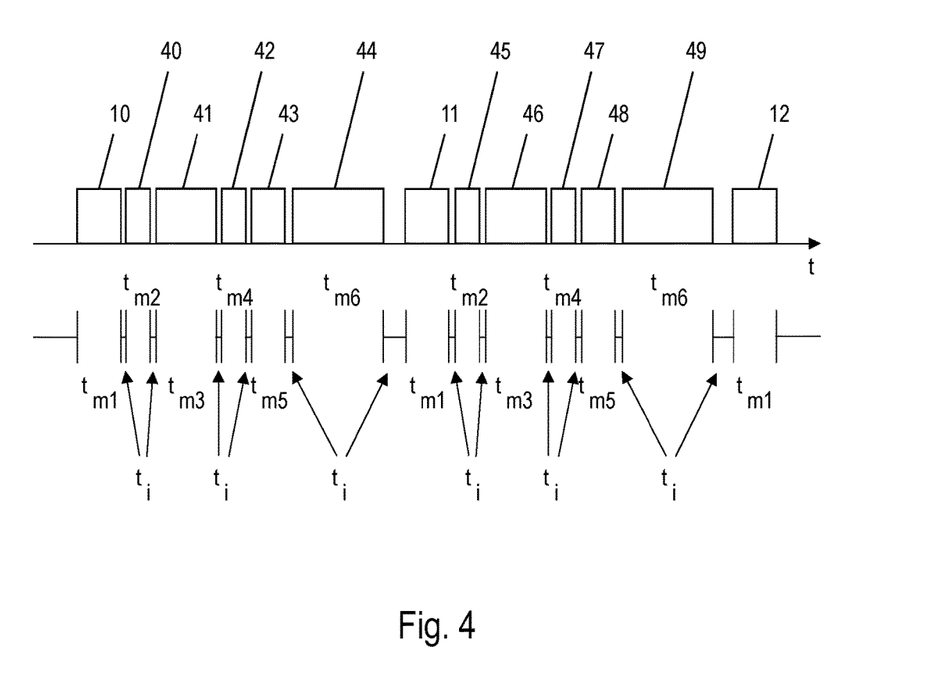
FIG. 4 shows timing of test cases, with active times and idle times, in accordance with example embodiments.

FIG. 4 shows timing of test cases, with active times and idle times, in accordance with example embodiments of the present invention. With reference to FIG. 4, the first test case comprises measurements 10, 11, 12, as already shown in FIG. 1. Further, a second test case comprises measurements 40, 45, a third test case comprises measurements 41, 46, a fourth test case comprises measurements 42, 47, a fifth test case comprises measurements 43, 48 and a sixth test case comprises measurements 44, 49. It can readily be seen that each of the respective test cases has active times $t_{m2}$, $t_{m3}$, $t_{m4}$, $t_{m5}$, $t_{m6}$. This results in a very low idle time $t_i$ of the testing unit. A very efficient use of the time of the testing unit is thereby achieved.

Figure 5:
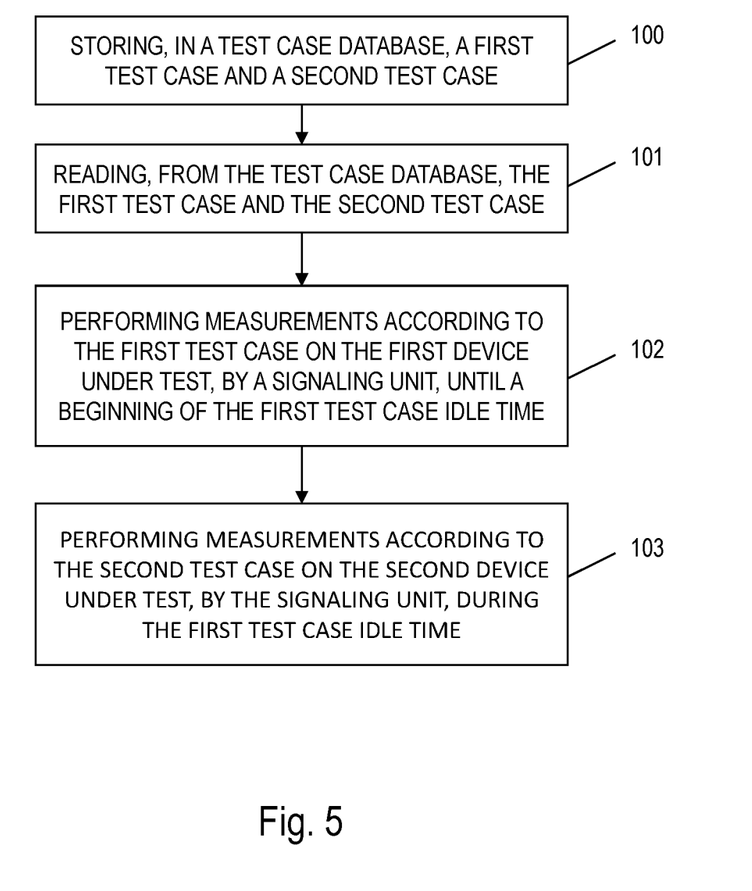
FIG. 5 shows a flow chart of a test method, in accordance with example embodiments.

FIG. 5 shows a flow chart of a test method, in accordance with example embodiments of the present invention. In step 100, test cases are stored in a test case database. By way of example, a first test case and a second test case are stored. By way of further example, the test cases include timing information, especially active times and idle times of the respective test cases. Further, the test cases may comprise the actual measurement parameters. In step 101, the first test case and the second test case are read from the test case database. In step 102, measurements according to a first test case are performed on a first device under test by a signaling unit until a beginning of the first test case idle time. In step 103, during the first test case idle time, measurements according to the second test case are performed on a second device under test by the signaling unit.

The embodiments of the present invention can be implemented by hardware, software, or any combination thereof. Various embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, or the like.

Various embodiments of the present invention may also be implemented in the form of software modules, processes, functions, or the like which perform the features or operations described above. Software code can be stored in a memory unit so that it can be executed by a processor. The memory unit may be located inside or outside the processor and can communicate date with the processor through a variety of known means.

The invention is not limited to the examples and especially not to a specific type of device under test. The device under test can be a communications device such as a mobile telephone or a machine type communications device. Also it can be a base station. The characteristics of the exemplary embodiments can be used in any advantageous combination.

Although the present invention and its advantages have been described in detail, it should be understood, that various changes, substitutions and alterations can be made herein without departing from the spirit and scope of the invention as defined by the appended claims.

While various embodiments of the present invention have been described above, it should be understood that they have been presented by way of example only, and not for limitation. Numerous changes to the disclosed embodiments can be made in accordance with the disclosure herein without departing from the spirit or scope of the invention. Thus, the breadth and scope of the present invention should not be limited by any of the above-described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

What is claimed is:

1. A test unit for testing at least a first device under test and a second device under test, comprising:
   a test case database configured to store at least a first test case and a second test case;
   a signaling unit connected to at least the first device under test and the second device under test; and
   a test case execution controller configured to read, from the test case database, at least the first test case and the second test case, and to control the signaling unit to perform measurements according to the first test case on the first device under test and according the second test case on the second device under test; and
   wherein each test case includes timing information that includes a respective active time and a respective idle time for the test case, and
   wherein a duration of the second test case active time is shorter than a duration of the first test case idle time.

2. The test unit according to claim 1, wherein the test case execution controller is configured to control the signaling unit to perform the measurements according to the first test case on the first device under test until a beginning of the first test case idle time, and to control the signaling unit to perform the measurements according to the second test case on the second device under test during the first test case idle time.

3. The test unit according to claim 2, wherein:
   the test unit is configured for testing a third device under test;
   the test case database is configured to store a third test case;
   the duration of the second test case active time in addition to a duration of the third test case active time is shorter than the first test case idle time;
   the signaling unit is connected to the third device under test; and
   the test case execution controller is configured to control the signaling unit to perform measurements according to the third test case on the third device under test during the first test case idle time, after performing the measurements according to the second test case on the second device under test.

4. The test unit according to claim 2, wherein:
   the test unit is configured for testing a plurality of further devices under test;

the test case database is configured to store a plurality of respective further test cases for the plurality of further devices under test;

durations of the plurality of further test cases in sum are shorter than the first test case idle time;

the signaling unit is connected to the plurality of further devices under test; and the test case execution controller is configured to control the signaling unit to successively perform measurements according to the plurality of further test cases, respectively, on the plurality of further devices under test during the first test case idle time.

5. The test unit according to claim 2, wherein the test unit further comprises:

a signal splitter configured to selectively connect the signaling unit to at least the first device under test and the second device under test.

6. The test unit according to claim 5, wherein the test case execution controller is configured to control the signal splitter to connect the first device under test to the signaling unit during performing measurements according to the first test case, and to control the signal splitter to connect the second device under test to the signaling unit during performing measurements according to the second test case.

7. The test unit according to claim 2, wherein the test case execution controller is configured to determine an optimal scheduling of performing the measurements according to said test cases based upon test case active time durations and the first test case idle time.

8. The test unit according to claim 1, wherein the signaling unit is configured to transmit signals to and receive signals from only one of the at least first device under test and second device under test at any one time.

9. The test unit according to claim 1, wherein at least the first device under test and the second device under test are machine type communication devices, and wherein the test unit is a machine type communication test unit.

10. The test unit according to claim 1, wherein each of the at least first test case and second test case comprises an individual active time and an idle time.

11. The test unit according to claim 1, wherein at least the first device under test and the second device under test are 5G communication devices.

12. The test unit according to claim 1, wherein the first test case comprises a Narrowband Internet of Things test and/or an enhanced Machine-Type Communication test.

13. The test unit according to claim 1, wherein the first test case idle time is defined by an extended Discontinuous Reception cycle of the first device under test.

14. A test method for testing at least a first device under test and a second device under test, the method comprising:

reading, from a test case database, at least a first test case and a second test case; and performing, by a signaling unit under control of a test execution controller, measurements according to the first test case on the first device under test and according to the second test case on the second device under test; and wherein each test case includes timing information that includes a respective active time and a respective idle time for the test case, and wherein a duration of the second test case active time is shorter than a duration of the first test case idle time.

15. The test method of claim 14, wherein the measurements according to the first test case are performed on the first device under test until a beginning of the first test case idle time, and the measurements according to the second test case are performed on the second device under test during the first test case idle time.

16. A non-transitory computer-readable storage medium having computer executable program code stored thereon, which when executed on one or more processors of a testing device causes the testing device to execute a process comprising:

reading, from a test case database, at least a first test case and a second test case performing, by a signaling unit under control of a test execution controller, measurements according to the first test case on the first device under test and according to the second test case on the second device under test; and wherein each test case includes timing information that includes a respective active time and a respective idle time for the test case, and wherein a duration of the second test case active time is shorter than a duration of the first test case idle time.

17. The non-transitory computer-readable storage medium according to claim 16, wherein the measurements according to the first test case are performed on the first device under test until a beginning of the first test case idle time, and the measurements according to the second test case are performed on the second device under test during the first test case idle time.

* * * * *